J. M. MOREHEAD.
PROCESS OF DISSOCIATING ACETYLENE.
APPLICATION FILED FEB. 3, 1908.
986,489.
Patented Mar. 14, 1911.
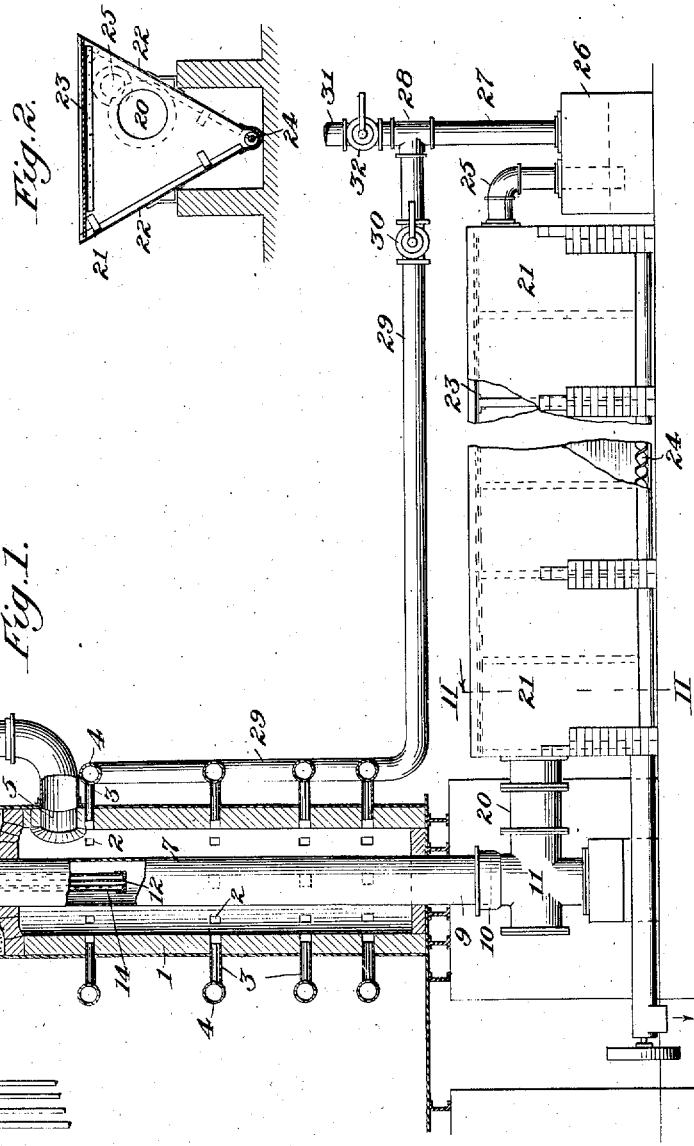
Witnesses:
Geo. E. Garrett
C. H. Potter
Inventor:
John M. Morehead,
by Byrnes & Townsend,
Att'ys.

UNITED STATES PATENT OFFICE.

JOHN M. MOREHEAD, OF CHICAGO, ILLINOIS, ASSIGNOR TO UNION CARBIDE COMPANY, OF CHICAGO, ILLINOIS, A CORPORATION OF VIRGINIA.

PROCESS OF DISSOCIATING ACETYLENE.

986,489.     Specification of Letters Patent.     Patented Mar. 14, 1911.

Application filed February 3, 1908. Serial No. 414,074.

*To all whom it may concern:*

Be it known that I, JOHN M. MOREHEAD, a citizen of the United States, residing at Chicago, in the county of Cook and State of Illinois, have invented certain new and useful Improvements in Processes of Dissociating Acetylene, of which the following is a specification.

In the ordinary process of producing lampblack from gas, oil or other carbonaceous fuel, the fuel is ignited and burned with a deficit of oxygen. The flame produced by such incomplete combustion is impinged upon some cold surface, whereon the carbon deposits and is scraped off from time to time. This process is very wasteful, as a large proportion of the carbon contained in the fuel is burned and lost, while a very considerable portion of the combined carbon is not deposited on the cold surface but escapes with the outgoing gases. Lampblack may be produced from acetylene by this method of incomplete combustion, but the efficiency of the process is so low that it is not commercially practicable.

It is possible to produce lampblack from acetylene by dissociating the compressed gas, as described in my U. S. Letters Patent No. 779,728, granted January 10, 1905. The gas, subjected to a pressure in excess of from one to two atmospheres, is exploded, whereupon instant dissociation takes place, the carbon, composing approximately ninety-two per cent. of acetylene, being deposited in the retainer as a solid, while the hydrogen remains as a gas. This process, while efficient, is expensive and at the same time attended with more or less danger, as at the instant of dissociation excessive pressures are generated in the container.

My present invention is a process of dissociating acetylene by heat, at approximately atmospheric pressure.

If acetylene is subjected to superatmospheric temperatures, chemical and physical changes, of great complexity take place. At 538° F., some of the acetylene condenses to benzene. As the temperature is further increased, ethylene, methane, styrolene, naphthalene and other decomposition and polymerization products result, either successively or simultaneously, along with a larger or smaller proportion of pure hydrogen and carbon, due to complete dissociation of a portion of the gas. There are also produced a number of liquid or semi-liquid hydrocarbons resembling tar. If these polymers of acetylene are continuously subjected to a temperature at or in excess of that which produced them, they break down and bake into a sort of dense hard gray coke, quite unlike lampblack. This hard coke gradually fills up the receptacle in which it is produced and eventually interrupts the process.

I have found that acetylene at practically atmospheric pressures, if suddenly heated to a temperature at or in excess of that corresponding to a dull red heat, dissociates instantly and quietly into its elements of carbon and hydrogen without the production of any of its polymers, and that the carbon so produced is either deposited in the heating retort, or is carried along with the gaseous hydrogen as a light flocculent powder, easily handled and practically chemically pure. My present process of making lampblack from acetylene is based on this discovery.

Suitable apparatus for carrying out the process is shown in the accompanying drawing, in which:

Figure 1 is a side elevation, partly in axial section; and Fig. 2 is a transverse vertical section of the lampblack-receiving and settling chamber, on the line II—II of Fig. 1.

The specific apparatus illustrated comprises a vertical retort and heating chamber and a horizontal settling chamber. The retort-heating chamber 1, which may be a cylindrical stack of firebrick held in an iron casing, has superposed horizontal rows of radial openings 2, receiving gas and air burners 3, supplied with gas by circular bustle-pipes 4. A lateral outlet 5 for products of combustion opens from the upper end of the chamber 1 into a waste-flue 6. Axially supported within the heating chamber 1 is a retort 7, which may be of firebrick or castiron. The upper end 8 of this retort is seated in the roof of the chamber and its lower end 9 rests in the socket 10 of a flue-piece 11. An acetylene discharge-pipe 12 opens centrally into the upper end of the retort 7, being fed with gas by a pipe 13. Around this pipe 12 is a jacket 14 through which water is circulated by supply and discharge pipes 15, 16. Seated in the upper end 8 of the retort is a bushing 17, closed by a plate which receives blast-nozzles 18, fed by a pipe 19. The flue-piece 11 which supports the lower end of the retorts opens laterally through a short flue 20 into a chamber 21 for receiving and settling the lampblack from the retort. This chamber, which may consist of sheet-iron, has downwardly converging sides 22 and a horizontal top 23. In the bottom of the chamber is a screw-conveyer 24 for delivering the lampblack at one end. A pipe 25 for the residual hydrogen leads from the end of the settling chamber into a seal-pot 26, having a vertical outlet pipe 27. This pipe is connected, by a T-coupling 28, both to a pipe 29, having a valve 30, which serves to deliver the gas to the burners 3, and to a waste-flue 31 having a valve 32. In using this apparatus to carry out the process, the retort 7 is heated, preferably by gas introduced through the burners 3, to or above the temperature of dull redness. A stream of acetylene, maintained at a temperature below its dissociation point by the water flowing through the jacket 14, is then delivered through pipe 12 into the upper end of the retort. The acetylene, issuing into the retort and suddenly heated to or above the temperature of dull redness, instantly and quietly dissociates, the carbon being set free in the form of lampblack, which largely collects in the retort, while the free hydrogen passes on through the settling chamber 21 and may be returned to the burners 3 to heat the retort. The current of hydrogen may also carry some of the lampblack into the settling chamber. As the retort becomes filled with lampblack, the stream of acetylene is cut off, valve 30 in hydrogen pipe 29 is closed and valve 32 in waste-pipe 31 is opened. An inert gas, preferably at the temperature of the retort, for example hot products of combustion, is then forced into the upper end of the retort through the nozzles 18, blowing the light lampblack out of the retort and into the chamber 21, where it settles, to be removed by the conveyer 24.

The residual hydrogen may be compressed and sold for use in the arts and the retort may be heated by other gas or fuel. The lampblack may be separated from the hydrogen by other usual means than the settling-chamber.

I claim:

1. The process of dissociating acetylene, which consists in suddenly heating a stream of acetylene to at least the temperature of dull redness.

2. The process of dissociating acetylene, which consists in delivering a stream of acetylene into a chamber heated to at least the temperature of dull redness.

3. The process of dissociating acetylene, which consists in delivering a stream of acetylene, maintained at a temperature below its dissociation point, into a chamber heated to at least the temperature of dull redness.

In testimony whereof, I affix my signature in presence of two witnesses.

JOHN M. MOREHEAD.

Witnesses:
  E. F. PRICE,
  JOHN S. ADAMS.